Patented Jan. 30, 1945

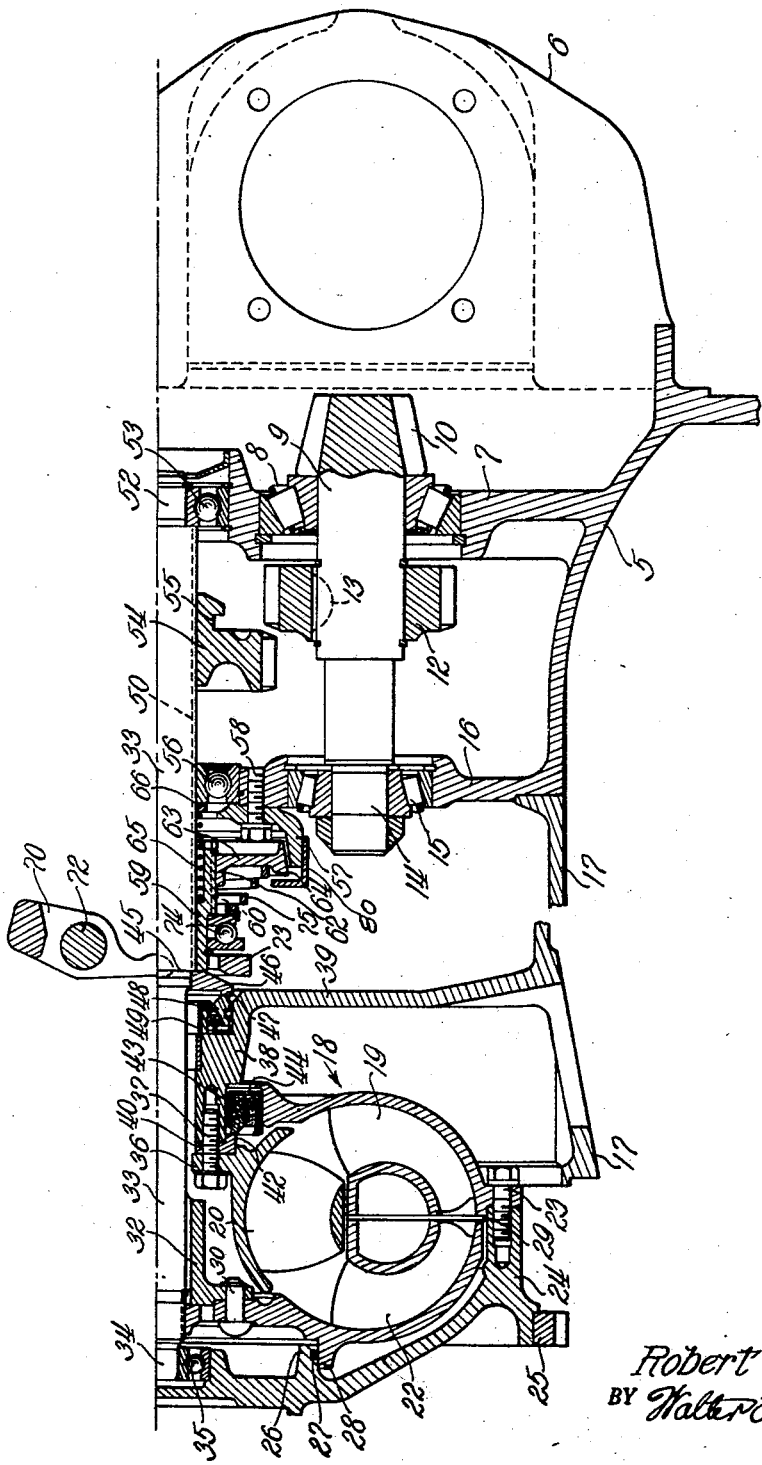

2,368,148

UNITED STATES PATENT OFFICE 2,368,148

TRANSMISSION

Robert Lapsley, Berrien Springs, Mich., assignor to Clark Equipment Company, Buchanan, Mich., a corporation of Michigan Application March 26, 1943, Serial No. 480,714

11 Claims. (Cl. 192—12)

This invention relates to transmissions, and more particularly is concerned with a transmission employing a fluid torque converter in conjunction with a reduction gear shiftable for either forward or reverse drive.

While the present invention is disclosed in its preferred form for use in conjunction with the driving of an industrial truck or tractor, it is to be understood that the features of the invention are equally well applicable to any type of transmission embodying the present construction, such as may be used for automotive truck or bus drives or the like.

The primary object of the present invention is to provide means operable by the operator for holding the driven shaft of the torque converter against rotation to facilitate shifting of the gears, and is so designed that this shaft can even be rotated reversely with respect to the idling torque imposed thereon by the torque converter in order that the gears may be shifted without the attendant pressure usually present in fluid drive constructions due to the torque produced in the driven shaft, even when the torque converter or fluid coupling is idling.

The provision of means for controlling the rotation of the driven shaft is essential in order, primarily, to remove the torque pressure on the gear teeth produced by the fluid drive so that the gears may be shifted out of engagement, and also to facilitate the shifting of the gears into mesh by controlling the driven shaft so that it can be slightly rotated in a reverse direction if it so happens that the gears happen to meet with the teeth in endwise abutment. It is essential that this control be provided if smooth and rapid shifting of the gears is to be produced, and to eliminate any clashing or burring of the ends of the teeth.

I preferably accomplish this in the present invention by the use of a fixed drum secured to a partition wall in the transmission housing in conjunction with a brake, preferably mounted on splines and operated by the brake pedal, which is adapted to engage the drum for locking the shaft upon which the brake is splined against rotation. By employing helical splines, the locking of the drum and brake actually produces a slight reverse rotation of the shaft, which, in some cases, is desired in order to prevent endwise abutment of the gear teeth during the shifting movement. While the shaft itself may be helically splined for this purpose, preferably, I mount a sleeve on straight splines on the driven shaft and mount the brake itself upon helical splines carried by the sleeve. This allows the machining of straight splines in the shaft, which in turn facilitates the axial shifting of the gear mounted on said shaft.

Other objects and advantages of the present invention will appear more fully from the following detailed description, which, taken in conjunction with the accompanying drawing, will disclose to those skilled in the art the particular construction and operation of a preferred form of the present invention.

The drawing discloses a sectional view through a transmission embodying the present invention.

Referring now in detail to the drawing, I provide a transmission and rear axle assembly for use particularly on industrial trucks, although this, as explained heretofore, is not intended as limiting the present invention. This housing is indicated at 5 and includes a bowl-shaped portion 6. in which is mounted the differential of the driving axle for the industrial truck. Disposed in a partition wall 7 in the housing is a bearing assembly 8 adapted to form a support for the pinion shaft 9 carrying the drive pinion 10 meshing with the ring gear (not shown), with the differential assembly enclosed within the housing portion 6. The shaft 9 is provided adjacent the bearing assembly 8 with a gear 12, which gear is preferably keyed to the shaft as by means of the key 13. At its opposite end, the shaft 9 is reduced, as at 14, and is supported in a suitable bearing assembly 15 carried in the wall 16 of the housing 5, whereby the shaft is mounted by the bearings 8 and 15 for rotation within the housing.

Secured to the wall 16 of the housing 5 and extending forwardly therefrom is a second housing 17 which includes a portion adapted to receive the fluid torque converter, indicated generally at 18. This converter comprises the impeller or driving element 19, the stator or reaction member 20 and the rotor or driven member 22. The impeller 19 is secured by means of the studs 23 to a flywheel member 24, which in turn is secured to the crankshaft of the engine. This spider carries the annular starting gear 25, and functions as the flywheel of the engine.

The spider also is provided with an annular flange portion 26 carrying a piston ring 27 forming a seal between the annular boss or projection 28 of the rotor and the flywheel, which seals this passageway against escape of fluid, tending to balance pressure within the annular space between the outer surface of the rotor 22 and the internal surface of the flywheel 29 against the pressure on the outer annular surface of the impeller 19. This pressure is built up by leakage of fluid out through the annular space 29 between the impeller and rotor at their outer periphery, and provides a reacting pressure counteracting the internal pressure within the converter. The rotor 22 is riveted or otherwise suitably secured, as at 30, to an internally splined sleeve 32 mounted on the driven shaft 33. The forward end of the shaft 33 is reduced as at 34, and is piloted as by means of the bearings 35 in the spider 24.

The reaction member or stator 20 is provided with an inwardly turned flange 36 bolted or otherwise secured, as by studs 37, to a projection 38 on the partition wall 39 of the housing 17. This holds the stator firmly against rotation in either direction.

Interposed between the flange 36 and the projection 38 there is provided the annular ring 40 which has a lip portion 42 bearing against the seal member 43, the seal member 43 being normally spring pressed against the lip 42 to provide a fluid tight seal therebetween. The member 43 is preferably formed of carbon, or a similar heat resistant substance, and is preferably contained within a sealed structure 44 of the type manufactured by the Chicago Rawhide Company.

The shaft 33 is provided with a radial shoulder 45 intermediate its ends against which is mounted the collar member 46, this collar member having a lip portion 47 bearing against a similar seal member 48 carried by the seal retainer 49 to provide a fluid seal between the shaft and the interior of the projection 38 of the wall 39.

The shaft 33 is longitudinally splined, as indicated at 50, from the shoulder 45 to a point adjacent its opposite end, at which point it is reduced as at 52 for journalling in the bearing assembly 53 carried by the wall 7. Intermediate the walls 16 and 7 of the housing 5 of the shaft 50 there is provided a gear 54 which is suitably splined and carries a shifter hub 55 for axial sliding movement on the shaft. The gear in the position shown is in neutral position. When shifted to the right, the gear is adapted to have engagement with the gear 12 to provide a reduction drive from the shaft 33 to the shaft 9. When shifted to the left, the gear 54 is adapted to engage a suitable gear on an idler shaft (not shown) which idler shaft in turn has meshing engagement with the gear 12, whereby, in this position, a reversal of drive is effected to the shaft 9.

The shaft 33 is supported intermediate its ends by the bearing 56 carried by the partition wall 16, and secured to the outer face of the wall is a drum member 57 which has a radially inturned portion provided with studs 58 for securing it rigidly and non-rotatively to the wall 16.

Mounted on shaft 33 and normally bearing against the collar 46 is a sleeve member 59 which is internally splined for axial sliding movement on the splines 50. This sleeve member is also provided with an externally splined portion 60, which preferably comprise helical splines adapted to receive the splined hub 62 of a spider member 63 carrying the brake surface 64. The spider member is preferably formed of hardened steel with a machined brake surface, whereas, the drum member 57 is formed of cast iron or the like. A suitable helical spring 65 is biased between the washer 66 abutting against the bearing assembly 56 and a relieved portion of the sleeve 59 to urge the sleeve in a direction away from the drum 57, thereby normally holding the brake 64 and drum 57 out of engagement. To operate the brake member, there is provided a rocker arm 70 mounted upon a fixed pivot 72 and having a yoke or collar portion 73 adapted to engage the throwout bearing 74 when the arm is rotated in a counterclockwise direction to apply axially pressure against the bearing 74, and consequently move the sleeve 59 axially to the right. This moves the spider 63 in a corresponding direction to engage the brake with the drum 57, and a suitable spiral spring 75 is provided for applying a pressure to the brake surfaces, but allows sleeve 59 to continue moving thru the spider 63. It will be apparent that when the spider 63 engages the drum 57, it will tend to stop rotating, and consequently, through the splining connection, as more pressure is applied to the sleeve, it will be threaded through the hub of the spider to produce a small amount of reverse rotation of the shaft 33 against the normal drag or torque produced on this shaft by the fluid in the converter 18. This is to prevent this normal idling torque or drag from the converter from imposing a pressure on the teeth of gears 54 and 12 sufficient to prevent or at least retard shifting movement thereof. By thus relieving this pressure, shifting of the gear 55 out of engagement with gear 12 is facilitated, and also shifting of the gear 55 out of engagement with the idler shaft gear is facilitated. In addition, when shifting to one position or to the other, clashing of the gears is prevented due to the fact that the helical spline in the brake assembly causes a slight reverse movement of the shaft so that if the teeth of the gears should happen to meet in endwise abutment, the slight rotation would rotate the gear 54 sufficient to move the teeth thereof into the spaces between the teeth of the gear 12 to allow completion of the shifting movement.

It is evident that the spring 75 provides a certain determined pressure between the brake surfaces which tends to hold the shaft 33 against rotation, and the torque of this shaft acts thru the helical splines to prevent the sleeve 59 from being pushed thru the spider 63 unless more push is used than required to deflect spring 75, which action provides a semi-self energizing type of brake action.

While it is apparent that in place of the helical splines 60, there might be provided straight splines at this point with helical splines on the shaft 33, or, if desired, helical splines might be provided on both the shaft 53 and the brake spider 63. However, I have found that by using helical splines at 60, sufficient reverse movement is provided and this allows the use of straight splines on shaft 33, which is of distinct advantage.

In order to prevent galling or freezing of the brake 64 in drum 57, I provide an annular retainer 80 pressed over the external surface of drum 57, which collects oil from bearing 56 and retains this oil to provide an oil film between the drum surface and brake. This insures collection of sufficient oil to prevent any possibility of sticking of the brake in the drum, or any galling of these braking surfaces.

It is therefore believed apparent that I have provided a simplified arrangement for eliminating the pressure of the torque drag of a fluid drive while shifting gears, and also have provided means for preventing clashing of gears by the control of the shaft 33 through the brake and drum assembly.

I therefore do not intend to be limited to the exact details herein shown and described, but only insofar as described by the scope and spirit of the appended claims.

I claim:

1. The combination with a fluid torque converter having a shaft driven thereby and change speed gearing driven by said shaft, of a sleeve splined on said shaft between said converter and gearing and having external helical splines, means for shifting said sleeve axially on said shaft, a brake having a hub portion carried on said helical splines and having a resilient pressure connection with said sleeve, and a fixed drum engageable by said brake upon actuation of said shifting means to hold said shaft against the idling torque of said converter.

2. The combination of claim 1 wherein said helical splines produce slight reverse rotation of said shaft, upon further actuation of said shifting means.

3. The combination of claim 1 wherein means is associated with said drum for retaining lubricant in contact with the braking surface thereof.

4. Means for facilitating shifting of gears in a change speed transmission having a drive shaft driven from a fluid torque converter, comprising a sleeve splined on said shaft, a brake having a hub, a helical splined connection between said hub and sleeve, spring means for urging said hub axially with said sleeve, and a fixed brake drum adapted to be engaged by said brake upon axial shifting of said sleeve for effecting slight reverse rotation of said shaft against idling torque of said converter to facilitate shifting of the gears in said transmission.

5. The combination, in a transmission having a shaft driven from a fluid torque converter and having a splined gear axially shiftable thereon, of a bearing support for said shaft intermediate the ends thereof and including a brake drum, a sleeve splined on said shaft and having external helical splines, a brake having a conical brake surface and a hub, said hub being mounted on said helical splines, means for moving said sleeve axially on said shaft, a spring biased between said sleeve and hub for moving said brake conjointly with said sleeve, and means for moving said sleeve axially toward said drum to engage said brake with said drum, and to rotate said shaft slightly in a reverse direction upon further movement of said sleeve, said spring accommodating said further movement.

6. A braking device for a shaft driven by a fluid torque converter comprising a sleeve splined on said shaft and having external helical splines, means for shifting said sleeve axially on said shaft, a brake having a hub mounted on said helical splines and movable axially relative to said sleeve, spring means biased between said sleeve and brake to provide limited conjoint movement thereof, and a fixed brake drum, said shifting means causing said brake to engage said brake drum during initial axial movement of said sleeve and thereafter threading said sleeve through said hub to effect reverse rotation of said shaft against idling torque of said converter, and said helical splines providing a semi-self energizing of said brake.

7. The combination, with a shaft having an axially shiftable gear splined thereon and subject to idling torque of a fluid torque converter during gear shifting movement and an intermediate bearing support for said shaft including an annular brake drum, of a braking mechanism for said shaft including a sleeve splined on said shaft for axial movement toward and away from said support, said sleeve having external helical splines, a brake having a hub mounted on said splines, resilient means biasing said brake toward the support end of said sleeve, and means for shifting said sleeve axially to initially contact said brake with said drum and on subsequent movement to thread said sleeve reversely through said hub for effecting slight reverse rotation of said shaft.

8. The combination of claim 7 including resilient means normally biasing said sleeve away from said support.

9. The combination of claim 7 including means associated with said drum for retaining oil in contact therewith.

10. Brake means for a transmission shaft comprising a fixed brake drum, a sleeve, a splined connection between said sleeve and shaft, a brake having a hub portion, a splined connection between said hub portion and sleeve, one of said splined connections comprising helical splines, means for shifting said sleeve axially on said shaft, and resilient means urging said hub portion axially with said sleeve to provide initial engagement of said brake with said drum for stopping said shaft, said resilient means providing for further shifting movement of said sleeve independently of said brake to effect slight reverse rotation of said shaft through said helical spline connection.

11. Means for effecting selective control of a transmission shaft subject to idling torque of a torque converter, comprising a sleeve having splined connection on said shaft, means for shifting said sleeve axially along said shaft, a brake including a hub having splined connections on said sleeve, resilient means providing conjoint movement of said brake and sleeve, and a fixed brake drum engageable by said brake upon initial actuation of said shifting means for stopping forward rotation of said shaft, one of said splined connections comprising helical splines whereby selected further movement of said shifting means imparts controlled reverse rotation to said shaft.

ROBERT LAPSLEY.